(No Model.)
F. W. BARTLETT.
COMPOSITE BUILDING MATERIAL AND THE METHOD OF PREPARING THE SAME.
No. 271,209. Patented Jan. 30, 1883.
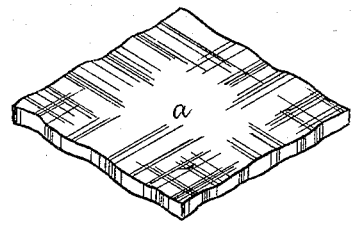
Fig 1
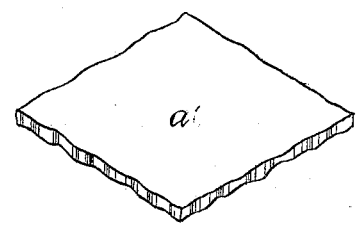
Fig 2
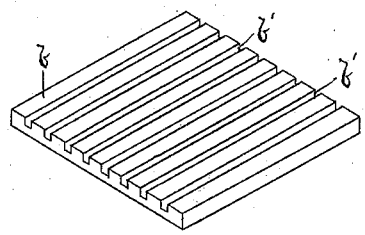
Fig 3
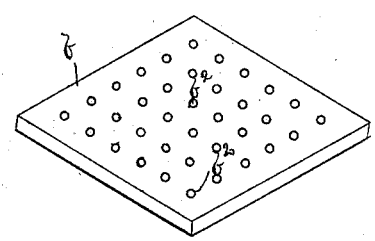
Fig 4
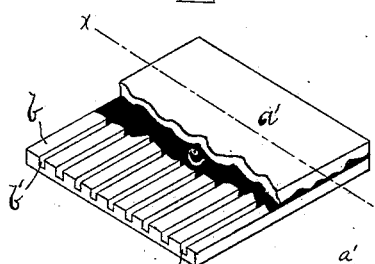
Fig 5
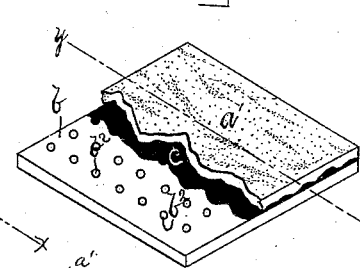
Fig 6
Fig 9
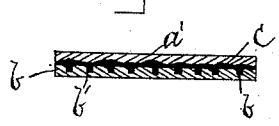
Fig 7
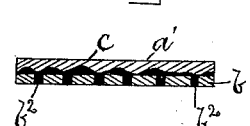
Fig 8
WITNESSES:
Otto Hoddick
H. H. Little
INVENTOR
Frederick W. Bartlett
BY
W. T. Miller
ATTORNEY

UNITED STATES PATENT OFFICE.

FREDERIC W. BARTLETT, OF BUFFALO, NEW YORK.

COMPOSITE BUILDING MATERIAL AND THE METHOD OF PREPARING THE SAME.

SPECIFICATION forming part of Letters Patent No. 271,209, dated January 30, 1883.

Application filed March 28, 1882. (No model.)

*To all whom it may concern:*

Be it known that I, FREDERIC W. BARTLETT, a citizen of the United States, residing at Buffalo, in the county of Erie and State of New York, have invented certain new and useful Improvements in Composite Building Material and the Method of Preparing the Same; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide for builders' use a material which combines in itself the inherent qualities of both wood and natural stone, being more durable than the former and less costly than the latter for building purposes; and to that end it consists broadly in a composite material of wood and natural stone, as well as in the method of preparing it, in which the natural stone, in the form of a comparatively thin veneer, forms the wearing-surface of the composite material, and the wood is employed as a backing to the stone. The union of the wood and stone enables me to utilize stone of varying thickness without the necessity of reducing the stone itself, the uniformity of thickness of the composite material being regulated by the reduction of the wood backing in any suitable manner subsequent to its union with the stone. This wood backing also serves both as a strengthening-piece for the thin layer of stone, as well as a convenient and reliable means for securing the stone in place. The composite material is prepared in a manner which will be more fully hereinafter described, and recited in the claims. In order that the same may be more fully understood, I have represented in the accompanying drawings, and will proceed to describe, the best and most inexpensive mode of producing this composite material at the present time, it being understood that both the mode of production as well as the materials used are capable of considerable variation without departing from the spirit of my invention.

In the drawings, Figures 1 and 2 are views of the stone in different stages of its preparation. Fig. 3 shows one form of wood backing. Fig. 4 shows a modified form thereof. Figs. 5 and 6 are perspective views of the composite material with portions broken away. Fig. 7 is a section of Fig. 5, taken on the line $x\ x$. Fig. 8 is a section of Fig. 6, taken on the line $y\ y$; and Fig. 9 shows two blocks of composite material joined by tongue and groove.

The natural stone which I employ in carrying out my invention is preferably of a laminiferous nature, such as argillaceous sandstone, slate, rock, &c., which is easily broken into thin layers suitable for the purpose. Other stone of a massive nature might be used, if desired—such as granite, marble, &c.—but not so cheaply, as its preparation, aside from the cost of the stone itself, would necessitate a much greater outlay of time and labor.

$a$ in Fig. 1 represents a thin layer of laminiferous stone with its rough unfinished edges and surfaces. I take this stone, and with any suitable apparatus I first smooth its upper surface and its edges to the required dimensions; or the trimming of the edges might be done simultaneously with the wood, to which the stone is subsequently united. Having done this, I next take thin blocks of wood, $b$, of about the size of the stone $a$, and either groove one of their surfaces, as at $b'$, Fig. 3, or both; or, in lieu of the grooves $b'$, I perforate the block, as shown at $b^2$, Fig. 4. I have a double object in so doing; first, to break the continuity of the fibers of the wood, and thus prevent warping, and, second, to form interstices in its surfaces, as will more fully hereinafter appear. The species of wood employed is to be selected with special reference to both cheapness and durability. If the composite material is liable to be exposed to moisture, it will be necessary to properly treat the wood with preservatives. This may be done by either saturating them with the preservative material by immersion or forcing such material, whether oleaginous or antiseptic, in a vaporiform state, into the pores of the wood. In other words, I treat the wood before its incorporation into the composite material with preservatives in such a manner that it is susceptible of reduction in size by trimming, planing, &c., without the necessity of a further application of the preservative after its incorporation as an element of the composite material. The preservative may, however, if desired, be incorporated in the wood after its union with the stone, or it may be entirely dispensed with under certain circumstances, and the wood used in its natural state.

Having prepared my natural stone and wood as just described, I take the block of wood, b, and apply to its grooved or perforated surface a thick coating of hydraulic or other cement in a plastic state, allowing such cement to completely fill the grooves or perforations thereof. I then take the block or layer of previously-prepared stone and lay its rough unfinished surface upon the coating of cement, and by means of a suitable press hold it firmly in contact therewith until the interposed layer of cement has had time to thoroughly set. The uneven surface of the stone and the grooves or perforations in the wood form ample space for the reception of a sufficient quantity of the cement, although these surfaces are practically in contact when the composite block is finished. After the blocks of stone and wood have been united as just described, or in any other analogous manner, their edges and the surface of the wood are planed or sawed uniformly down to the size of block required, as clearly shown in Figs. 5 and 6, in which portions are shown broken away to display the cement c and the grooves and perforations in the wood.

If desirable, the smooth surface a' of the natural stone may be further finished by marbleizing, as shown in Fig. 6; or such surface may be vitrified, carved, or otherwise ornamented to enable the composite block to be additionally used in a decorative way.

My composite block is susceptible of many and varied uses, such as roofing and flooring tiles, outside and inside walls and ceilings of buildings, surfaces of steps, lining of tanks, elevator-bins, refrigerators, &c., and can be used, as desired, to form both plain and ornamental surfaces, while the backing of wood enables it to be readily applied in any position whatever by means of cement, screws, or other well-known means.

The block of composite material may be formed with tongues and grooves made in the wood backing, so as to enable them to be additionally secured, as clearly shown in Fig. 9 of the drawings; and, in place of the solid backing of wood, the stone may have a number of separate strips of wood secured thereto in the same manner as the solid wood backing without ceasing to embody my invention.

I lay no claim to the use of artificial stone of any description in the construction of my improved composite building material, my invention being limited only to the employment of natural stone, and preferably natural stone of a laminiferous nature, such stone being peculiarly adapted by means of its cleavage property for utilization as an element of my composite building material.

I claim—

1. As a new article of manufacture, a composite building-block composed of layers of wood and natural stone suitably joined together, the stone forming the exposed or wearing surface and the wood the attaching-surface, substantially as shown and described, and for the purpose stated.

2. As a new article of manufacture, a composite building-block composed of layers of wood and natural stone suitably joined together, the stone forming the exposed or wearing surface, and the wood the attaching-surface, the wood having been treated with preservatives to prevent decay, substantially as shown and described, and for the purpose stated.

3. As a new article of manufacture, a composite building-block composed of layers of wood and natural stone suitably joined together, the stone forming the exposed or wearing surface and the wood the attaching-surface, the wood portion being provided with tongues and grooves, substantially as described, and for the purpose stated.

4. The process of manufacturing composite building material, consisting substantially in taking a rough layer of natural stone of uneven thicknesses and smoothing one surface thereof, leaving the other surface and its edges in their rough state, then preparing a layer of wood by suitably grooving or perforating its surface or surfaces and securing such layer of wood to the rough surface of the natural stone by cement or other adhesive material, and then reducing the composite block so formed to uniform dimensions in any suitable manner, substantially as shown and described.

5. The process of manufacturing composite building material, consisting substantially in taking a rough layer of natural stone of uneven thicknesses, and smoothing to the required dimensions one surface and its edges thereof, leaving the other surface in its rough state, then preparing a layer of wood by suitably grooving or perforating its surface or surfaces and securing such layer of wood to the rough surface of the natural stone by cement or other adhesive material, and then reducing the composite block so formed to uniform dimensions by removing portions of the wood backing in any suitable manner, substantially as shown and described.

FREDERIC W. BARTLETT.

Witnesses:
H. E. BROWNE,
W. T. MILLER.